United States Patent [19]
Noda et al.

[11] Patent Number: 5,547,822
[45] Date of Patent: Aug. 20, 1996

[54] PROCESS FOR PRODUCING TITANIUM DIOXIDE PIGMENT FOR PHOTOGRAPH AND PHOTOGRAPHIC SUPPORT COMPRISING SAME

[75] Inventors: Touru Noda, Matsudo; Akira Uno, Kashiwa; Kazuyoshi Muraoka, Akita, all of Japan

[73] Assignees: Mitsubishi Paper Mills; Tohkam Products, both of Tokyo, Japan

[21] Appl. No.: 286,378

[22] Filed: Aug. 4, 1994

Related U.S. Application Data

[60] Continuation of Ser. No. 94,951, Jul. 22, 1993, abandoned, which is a division of Ser. No. 714,847, Jun. 13, 1991, Pat. No. 5,264,033.

[30] Foreign Application Priority Data

Jun. 20, 1990 [JP] Japan .................................. 2-162084

[51] Int. Cl.$^6$ ............................... G03C 1/76; B32B 5/16
[52] U.S. Cl. .......................... 430/531; 427/189; 427/190; 428/328; 428/330; 428/337; 428/339; 428/511; 428/513; 430/523; 430/532; 430/534; 430/536; 430/935; 430/939; 430/947
[58] Field of Search ..................... 428/328, 337, 428/339, 500, 702, 507, 511, 512, 513, 330; 430/531, 532, 534, 536, 539, 270, 907, 523, 935, 939, 947; 427/180, 189, 190; 106/447, 436; 423/84, 610, 615, 616; 264/80, 276.1

[56] References Cited

U.S. PATENT DOCUMENTS

| | | | |
|---|---|---|---|
| 3,862,297 | 1/1975 | Claridge et al. | 423/615 |
| 4,447,524 | 5/1984 | Uno et al. | 430/538 |
| 5,075,206 | 12/1991 | Noda et al. | 430/531 |
| 5,094,834 | 3/1992 | Wiederhoft et al. | 423/616 |
| 5,169,619 | 12/1992 | Yoshimoto et al. | 423/610 |
| 5,173,386 | 12/1992 | Murawawa et al. | 430/84 |
| 5,173,397 | 12/1992 | Noda et al. | 430/531 |
| 5,264,033 | 11/1993 | Noda et al. | 106/447 |

FOREIGN PATENT DOCUMENTS 50-364440 11/1975 Japan .
59-1544 1/1984 Japan .

*Primary Examiner*—Dhirajlal Nakarani
*Assistant Examiner*—H. Thi Le
*Attorney, Agent, or Firm*—Cushman Darby & Cushman

[57] ABSTRACT

Disclosed is a process for producing a titanium dioxide pigment used for a resin-coated paper type photographic support, comprising the following steps:

(a) a step of adding at least one alkaline earth metal compound in an amount of 0.01–2.0% by weight in terms of a metal oxide based on the titanium dioxide before calcination step and (b) an acid-washing step of washing the titanium dioxide at acidic state after the calcination step and before a step of surface treatment with a hydrated metal oxide, and wherein particle size of the titanium dioxide pigment is 0.110–0.150 μm shown by number-average diameter obtained by measuring the diameter in a certain direction using an electron microscope. A photographic support which comprises the above titanium dioxide pigment is also disclosed. Occurrence of die lip stain and microgrit are substantially reduced in the photographic support and a photographic material made thereof exhibits improved image sharpness.

6 Claims, No Drawings

PROCESS FOR PRODUCING TITANIUM DIOXIDE PIGMENT FOR PHOTOGRAPH AND PHOTOGRAPHIC SUPPORT COMPRISING SAME

This is a continuation of application Ser. No. 08/094,951, filed on Jul. 22, 1993, which was abandoned upon the filing hereof which is a Divisional of Ser. No. 07/714,847, filed Jun. 13, 1991, now U.S. Pat. No. 5,264,033.

BACKGROUND OF THE INVENTION

The present invention relates to a process for producing a titanium dioxide pigment useful for photograph and a photographic support comprising it. More particularly, it relates to a photographic support in production of which occurrence of die lip stain and microgrit is substantially retained, and which meets requirements of a higher sharpness.

Since resin-coated paper type photographic supports were developed several ten years ago, various patent applications have been made thereon and considerable improvements have been made in their quality and in production technique thereof.

It is not too much to say that all of the problems relatively easy to improve have been solved until now.

At present, important problems which have not yet been fully improved in spite of the efforts made by the manufacturers in this field are so-called die lip stain and microgrit in production thereof.

Patent applications on solution of the problem of die lip stain (die lip streaks) were filed in comparatively earlier time. For example, a method in which zinc oxide and a specific dispersant are contained in a composition of a resin and a titanium dioxide pigment is proposed in Japanese Patent Application Kokai No. 53- 02947. For improvement in respect of resin, Japanese Patent Application Kokai No. 57-109948 discloses to limit a specific characteristic value n and for improvement in respect of a titanium dioxide pigment, Japanese Patent Application Kokai No. 58-17433 discloses to use titanium dioxide pigments in which the surface of particles is coated with di- tetra-hydric alcohols.

However, solution of the problem of die lip stain is so difficult that satisfactory photographic support has not yet been obtained by only improving materials and use of materials in combination.

The microgrit which originates from resin per se has been the problem called resin gel in the field of resins for a long time. Furthermore, in the case of masterbatch containing a titanium dioxide pigment, it has been known as microgrit. This problem is described, for example, in Japanese Patent Application Kokai No. 59-1544, pages 3–4.

Although not concerning with a process for producing a titanium dioxide pigment for photograph, Japanese Patent Application Kokoku No. 50-36440 discloses a process for producing a pigment titanium dioxide, which comprises the steps of (a) hydrolyzing a solution of titanium sulfate to produce a precipitate of hydrated titanium dioxide, (b) washing the precipitate, (c) treating the thus washed precipitate with at least one treating agent selected from lithium, beryllium, aluminum, magnesium, zinc, sodium, potassium, rubidium, cesium, and compounds of these metals, (d) treating the precipitate with a volatile ammonium compound, and (e) introducing the precipitates obtained in the steps (c) and (d) into futile forming seed and calcining it at 750°–1000° C., wherein pH of the above wet precipitate is 6–10 just before the calcination and the precipitate just before the calcination is accompanied by (i) at least 0.7% by weight in total of volatile ammonium compound (one or more kinds) (in terms of ammonium sulfate based on the weight of titanium dioxide), (ii) totally 0.02–0.50% by weight of a treating agent selected from beryllium, aluminum, magnesium, zinc, and compounds of these metals (in terms of metal oxide based on the weight of titanium dioxide), and (iii) 0.05–1.0% by weight of a treating agent selected from the group consisting of sodium, potassium, rubidium, cesium, and compounds of these alkali metals (in terms of alkali metal oxide based on the weight of titanium dioxide), with a proviso that lithium and/or at least one lithium compound may be substituted with one or all of the treating agents selected from the group referred to in the above (ii) and/or (iii).

This patent publication discloses treatment with lithium and other several kinds of metals and compounds thereof, but also discloses that lithium and/or at least one lithium compound is partially or totally substituted in preference to the other metals and compounds thereof. The publication makes no mention of limitation to a specific particle size and besides, the objects thereof are improvements of lightness (L value), coloring power and texture.

Furthermore, Russian Patent No. 975576 discloses a rutile type titanium dioxide pigment prepared through an acid washing step after a calcination step as a titanium dioxide pigment which can be used for making a photographic paper. However, this patent makes mention of neither die lip stain nor microgrit. Further, the object thereof is to reduce photographic activity. This is referred to on pages 14–16 of Japanese Patent Application No. H.1-58943.

Taking into consideration the above prior art, problems (tasks) to be solved by the present invention will be explained in detail.

Recently, demand for photographic supports of high quality, for example, of high sharpness has more and more increased and tendency to increase content of a titanium dioxide pigment in a resin layer of a photographic support has increased.

When concentration of a titanium dioxide pigment in a resin layer of a thermoplastic resin-coated paper is raised, a photographic support on which a printed image high in sharpness can be obtained, but serious problems often occur in photographic properties and production technique. That is, when a thermoplastic resin composition, especially a polyolefin resin composition, which contains a titanium dioxide pigment is melt extruded into a film from a slit die and applied to a substrate, a sticking matter or a stain in the form of a needle or an icile (hereinafter referred to as "die lip stain") tends to be formed on the tip of die lip after a short run extrusion. Since the die lip stain tends to grow larger with lapse of time of the run, it is very troublesome.

If this die lip stain occurs during melt extrusion coating, streaks are generated on the surface of the thus produced thermoplastic resin-coated paper or the stain sometimes comes off and sticks to the resin layer, resulting in a foreign matter. Therefore, the surface property of the thermoplastic resin-coated paper is seriously damaged, and such paper is utterly unsuitable as a photographic support which requires excellent surface property and has no commercial value. In order to remove completely the die lip stain once formed, the production has to be shut down to clean the die lip or exchange the die. The cleaning or exchanging requires much labor and time, resulting in considerable reduction of productivity.

A further problem is that in a photographic support coated with a thermoplastic resin composition, especially a polyolefin resin composition, which contains a titanium dioxide pigment, fine foreign matters or particles called microgrit are apt to be formed on the surface of the resin containing the titanium dioxide pigment on the image forming side of the support.

If microgrit is formed on a resin-coated paper used as a photographic support, serious photographic problems are brought about. That is, when a portrait is developed on a photographic paper using a photographic support of a resin-coated paper having microgrit, and if the microgrit appears in the portion of a face or the like, commercial value of the paper is completely lost. This microgrit also tends to be generated more often when concentration of a titanium dioxide pigment in the resin layer of the thermoplastic resin-coated paper is increased.

SUMMARY OF THE INVENTION

As mentioned above, for obtaining a photographic support which can provide a printed image of high sharpness in an attempt to meet the demand of customers, concentration of a titanium dioxide pigment in a resin layer of the thermoplastic resin-coated paper must be as high as possible and die lip stain and microgrit are more conspicuously generated.

The present invention has been accomplished for solving these serious problems.

That is, the present inventors have functionally investigated the production steps from preparation of a titanium dioxide pigment to production of a photographic support and as a result, they have found a method for producing a titanium dioxide pigment for photograph which is very suitable for use in a photographic support, and which causes least formation of die lip stain and microgrit even if sharpness of a printed image to be formed thereon is increased. Thus, the present invention has been accomplished.

The present invention provides a method for producing a titanium dioxide pigment to be used in a resin-coated paper type photographic support which comprises a substrate such as a paper, a synthetic paper or a film which is coated with a thermoplastic resin composition containing a thermoplastic resin and a titanium dioxide pigment on at least one side, wherein the titanium dioxide pigment is produced through production steps including the following steps:

(a) a step of adding at least one alkaline earth metal compound in an amount of 0.01–2.0% by weight in terms of a metal oxide based on the titanium dioxide before calcination step and (b) an acid-washing step of washing the titanium dioxide at acidic state after the calcination step and before a step of surface treatment with a hydrated metal oxide, and wherein particle size of the titanium dioxide pigment is 0.110–0.150 μm, shown by number-average diameter obtained by measuring the diameter in a given direction using an electron microscope.

The present invention further provides a resin-coated paper type photographic support comprising a substrate such as a paper, a synthetic paper or a film coated with a thermoplastic resin composition containing a thermoplastic resin and a titanium dioxide pigment on at least one side, wherein the titanium dioxide pigment comprises the titanium dioxide pigment produced as mentioned above.

That is, the present invention relates to a method for producing a titanium dioxide pigment very suitable for using in a photographic support, wherein said titanium dioxide pigment is produced through calcination step after addition of an alkaline earth metal compound and through the subsequent acid-washing step conducted at a specific stage of production steps and wherein the titanium dioxide pigment has a particle size within a specific range and the present invention further relates to a photographic support in which the above-mentioned titanium dioxide pigment is used and die lip stain and microgrit are generated quite a little and which can provide a high sharpness.

DETAILED DESCRIPTION OF THE INVENTION

The present invention will be explained in detail.

Representative method for producing the titanium dioxide pigment used in the present invention is a sulfuric acid method comprising the following steps.

Raw titanium dioxide→digestion, extraction→allowing to stand, crystallization→filtration, concentration→hydrolyzation→washing→calcination→grinding, screening→wet grinding, classification→surface treatment→ washing, drying→finishing grinding→titanium dioxide pigment In the sulfuric acid method, ferric sulfate is usually crystallized from a solution of ilmenite in sulfuric acid and then removed and the resulting aqueous titanyl sulfate solution is hydrolyzed to obtain hydrated titanium oxide, which is calcined to improve the properties as a pigment. The hydrolysis of the aqueous titanyl sulfate solution can be carried out by a so-called self seed method which comprises adding the aqueous titanyl sulfate solution to warm water to precipitate hydrated titanium oxide, which is used as a seed, or a so-called external seed method which comprises adding, as a seed, titanium hydroxide prepared by neutralizing titanyl sulfate or titanium tetrachloride.

The titanium dioxide pigment used in the present invention is prepared by adding an alkaline earth metal compound before the calcination step, wherein preferred steps are to wash titanium dioxide after hydrolyzation, then to place it, after thickening on a filter or the like, in a mixer, e.g. a kneader, to which the alkaline earth metal compound is added and mixed well, and finally to calcine the mixture.

As the alkaline earth metal compound, there may be used sulfates, nitrates, chlorides, carbonates, hydroxides, oxides and the like of various alkaline earth metals and examples thereof are berylliun hydroxide, magnesium hydroxide, magnesium sulfate, magnesium carbonate, magnesium chloride, calcium hydroxide, strontium chloride and barium chloride. Preferred are magnesium compounds and barium compounds.

The titanium dioxide pigment used in the present invention has a particle diameter of 0.110–0.150 μm in terms of a number-average diameter measured in a given direction using an electron microscope. In the case of a photographic support coated with a thermoplastic resin composition containing titanium dioxide pigment having a number-average diameter of less than 0.110 μm, die lip stain tends to occur often during production and occurrence of microgrit is also conspicuous and besides, sharpness of a printed image formed on the photographic support is low. On the other hand, a photographic support coated with a thermoplastic resin composition containing titanium dioxide pigment having a number-average diameter of more than 0.150 μm has the problem that sharpness of a printed image formed thereon is appreciably low. Thus, the titanium dioxide pigment used in the present invention has preferably a number-average diameter of 0.110–0.150 μm for reducing die lip stain and microgrit during production of photographic support, and for maintaining high sharpness of a printed image of high sharpness. The titanium dioxide pigment having a number-average diameter of 0.110–0.150 μm can be obtained by producing it under production conditions adjusted to optimum. Production conditions for the titanium dioxide pigment, especially calcination conditions such as calcination temperature, calcination time, and kind and amount of the alkaline earth metal compound allowed to be present at the time of calcination can be determined by obtaining the number-average diameter by measuring the diameter in a given direction of the titanium dioxide pigment produced under conditions of a series of combined experiments, the measurement of the diameter in a certain direction being carried out using an electron microscope. In this case, the typical calcination conditions for obtaining larger number-average diameter are high calcination temperature, long calcination time, and small amount of the alkaline earth metal compound present at the time of calcination. On the other hand, the typical calcination conditions for obtaining small number-average diameter are low calcination temperature, short calcination time, and large amount of the alkaline earth metal compound to be present at the time of calcination. Especially preferred calcination conditions for the titanium dioxide pigment used in the present invention are combinations of 800°–1100° C. as a calcination temperature, 15 minutes–5 hours as a calcination time and 0.01–2.0% by weight in terms of metal oxide based on titanium dioxide as an amount of the alkaline earth metal compound to be present at the time of calcination.

Besides, if necessary for operation, various inorganic compound as disclosed in Japanese Patent Application Kokoku No. 48-18718 may be added.

In the present invention, any of rutile type titanium dioxide pigment, anatase type titanium dioxide pigment, mixed crystal titanium dioxide pigment of rutile type and anatase type, and mixtures thereof can be used, but rutile type is preferred for obtaining a photographic support which can provide a printed images of especially high sharpness.

The product which has been subjected to calcination step in this way is hereinafter referred to as "titanium dioxide clinker" or merely "clinker". The clinker is ground in a dry state by a centrifugal roller mill such as Raymond mill; air mill; and the like and the ground product was suspended in water to make a titanium dioxide slurry and this slurry is further subjected to wet grinding in a wet ball mill or vibration mill and then, is subjected to wet classification by centrifugal separation using a continuous type horizontal centrifugal separator and/or by passing through a vibration type double-deck screen (U.S. standard screen: 325 mesh) to obtain a titanium dioxide slurry substantially free from coarse particles (which is hereinafter referred to as "fines"). The fines from which coarse particles have been removed and which are still in the form of slurry are subjected to acid-washing at acidic state and thereafter, the titanium dioxide particles are surface treated with a specific amount of a hydrated metal compound. After the surface treatment, the slurry is filtered and washed with water using a filter press and is further finely ground by an impact grinder and/or a fluid energy mill to obtain a titanium dioxide pigment.

In the present invention, a titanium dioxide having rutile structure (hereinafter sometimes referred to as "rutile type titanium dioxide") means one which comprises at least 90% by weight, preferably at least 95% by weight of rutile structure in its crystal structure. Furthermore, the number-average diameter here means a value obtained by measuring the length in a given direction of 1000 titanium dioxide particles and averaging the obtained values and is shown by μm.

The titanium dioxide pigment used in the present invention is preferably prepared by subjecting to acid-washing after the wet grinding. The acid-washing can be carried out, for example, by a method which comprises adding to the titanium dioxide slurry a mineral acid such as sulfuric acid, hydrochloric acid or nitric acid, preferably sulfuric acid, if necessary, diluted with water, namely, in the form of a dilute mineral acid such as a dilute sulfuric acid, washing the slurry with stored water, and removing the supernatant, a method which comprises repeating the above procedure several times, or a method which comprises acid-washing the titanium dioxide slurry with flowing water on a filter. Concentration of the titanium dioxide slurry in the acid-washing treatment is preferably 100–300 g/l and acidity of the slurry is preferably 3 or less, more preferably 2 or less in pH value. Temperature of the slurry in the acid-washing treatment, namely, acid-washing temperature is preferably from room temperature to 90° C., more preferably 40°–80° C. With reference to acid-washing time, it is preferred to carry out the acid-washing for about 10 minutes–2 hours and repeat it several times in the case of the method of using the stored water and for at least 2 hours in the case of using the flowing water.

The thus acid-washed titanium dioxide slurry is subjected to a series of treatments of surface treatment, dehydration, water-washing, drying and grinding to obtain a titanium dioxide pigment.

The treatment of the surface of titanium dioxide particles with hydrated metal oxide can be performed by the following method. That is, the titanium dioxide slurry is subjected to wet grinding and classification and then, pH is adjusted to 5 or more, preferably 6 or more, more preferably about 7. Thereafter, to the titanium dioxide slurry are added a water-soluble aluminum salt and, if necessary, another water-soluble metal salt or water-soluble silicon compound, and subsequently pH of the slurry is changed to precipitate on the surface of titanium dioxide pigment a slightly soluble hydrated aluminum oxide and, if necessary, another slightly soluble hydrated metal oxide. Thus, the titanium dioxide particles can be surface treated. For example, a representative method of the surface treatment using a reaction bath with a stirrer is as follows: A water-soluble alkali solution such as sodium hydroxide or potassium hydroxide is added to the titanium dioxide slurry obtained after subjected to wet grinding and classification steps, thereby to adjust pH of the slurry to 7.0±1.0. To this pH adjusted titanium dioxide slurry are added an aluminate such as an alkali aluminate and, if necessary, an aqueous solution of a water-soluble alkali such as sodium hydroxide or potassium hydroxide. Thereafter, in order to decrease pH of the slurry which is alkaline and to precipitate hydrated aluminum oxide on the surface of the titanium dioxide particles, a mineral acid such as sulfuric acid or hydrochloric acid or an aqueous solution of a salt which reacts as an acid is added to the slurry, thereby to accomplish the surface treatment.

The thus surface treated titanium dioxide slurry usually has a pH of 7.0±1.0. Sodium aluminate is especially useful as alkali aluminates. It is also possible to carry out the surface treatment with an inorganic surface treating agent in addition to the aluminate. In this case, the inorganic surface treating agent can be added at any stage before, during and after addition of the aluminate, but it is especially advantageous to add it before addition of the aluminate.

As the inorganic surface treating agents other than the aluminates, there may be used various compounds such as alkali silicates and silicon tetrachloride as silicon compounds, titanium tetrachloride as titanium compounds and besides, metal compounds of zirconium, zinc, manganese and the like, and phosphoric acid compounds.

In this case, for example, when hydrated aluminum oxide is used, it is used in an amount of 0.15–1.5% by weight, preferably 0.2–1.2% by weight (in terms of $Al_2O_3$) based on the titanium dioxide.

For further increase of sharpness of a printed image formed on the resin-coated paper type photographic support which contains the titanium dioxide pigment in a resin layer, it is preferred to wash the surface treated titanium dioxide pigment with water until the suspension electric conductivity defined below reaches 60 μv/cm or less. The suspension electric conductivity of titanium dioxide pigment here is defined as follows. 10.0 g of a titanium dioxide pigment is added to 100 ml of distilled water in a beaker of 100 ml in volume and the content in the beaker is stirred on a magnetic stirrer by stirring power of a rotator (rotating rate: 420 rpm) for 16 minutes keeping the liquid temperature at 21.5° C.±0.5° C. to make a suspension of the titanium dioxide pigment. 16 minutes after start of the stirring, suspension electric conductivity of the suspension of the titanium dioxide pigment is measured by an electric conductivity meter at 21.5° C.±0.5° C. with stirring. The resulting electric conductivity is defined to be the suspension electric conductivity of the titanium dioxide pigment in the present invention.

The titanium dioxide pigment used advantageously in the present invention which has a suspension electric conductivity of 60 μv/cm or less is prepared in the following manner. That is, after the surface treatment, the original mother liquor is filtered with a filter press and subsequently, the titanium dioxide cake in the filter press is washed with flowing water until a titanium dioxide pigment having a suspension electric conductivity of 60 μv/cm or less is obtained. The water washing conditions such as time, amount of water and pressure of water can be determined by subjecting the titanium dioxide cake collected under a series of combinations of experiments to the successive treatments of drying and grinding to prepare a titanium dioxide pigment and measuring the suspension electric conductivity of the titanium dioxide pigment. The washing with water can be carried out in the following manner. The slurry containing titanium dioxide as such or in the form of suspension obtained by suspending the filter cake again in the bath is washed with stored water or flowing water in the form of exchanging of supernatant. The washing with water can be carried out simultaneously with washing with water in the filter press or separately. From the point of further increase of sharpness of a printed image on the photographic support, the titanium dioxide pigment used in the present invention has a suspension electric conductivity of preferably 55 μv/cm or less, more preferably 50 μv/cm or less.

From the point of further increase in sharpness of a printed image on the resin-coated paper type photographic support containing the titanium dioxide pigment in a resin layer, it is advantageous to produce the titanium dioxide pigment by finely grinding by a fluid energy mill the titanium dioxide cake after being subjected to water washing and drying. As the fluid energy mills, steam mills such as a micronizer are especially preferred, but air mills may also be used. It is especially preferred to carry out the first stage grinding by an impact grinder such as a hammer mill before grinding by a fluid energy mill and then, the fine grinding by a fluid energy mill as the second stage grinding.

If necessary, the titanium dioxide pigment used in the present invention may be treated with various organic compounds such as triethanolamine, trimethylolpropane, metal salts of fatty acids, and organopolysiloxanes.

As antioxidants used in the present invention, there may be used various antioxidants such as phenolic type, amine type and phosphate ester type as far as they cause no problems when contained in the resin composition which constitutes a resin layer provided on the side of the resin-coated paper type photographic support on which images are to be formed. However, hindered phenol type antioxidants are especially preferred because they give no adverse effect on the photographic emulsion layer and they can more effectively inhibit die lip stain. As these preferred hindered phenol type antioxidants, mention may be made of, for example, 1,3,5-trimethyl-2,4,6-tris(3,5-di-tert-butyl-4-hydroxybenzyl)benzene, tetrakis[methylene(3,5-di-tert-butyl-4-hydroxy-hydrocinnamate)]methane, octadecyl-3,5 -di-tert-butyl-4-hydroxy-hydrocinnamate, 2,2',2"-tris[(3,5-di-tert-butyl-4-hydroxyphenyl)propionyloxy]ethylisocyanurate, 1,3,5-tris(4-tert-butyl-3-hydroxy- 2,6-dimethylbenzyl)isocyanurate, tetrakis(2,4-di-tert-butylphenyl)- 4,4'-biphenylenediphosphite ester, 4,4' -thiobis-(6-tert-butyl-o-cresol), 2,2'-thiobis-(6-tert-butyl-4-methylphenol), tris-(2-methyl-4-hydroxy-5-tert-butylphenyl)butane, 2,2'-methylene-bis-(4-methyl-6-tert-butylphenl), 4,4-methylene-bis-(2,6-di-tert-butylphenol), 4,4'-butylidenebis-(3-methyl-6-tert-butylphenol), 2,6-di-tert-butyl-4-methylphenol, 4 -hydroxy.methyl-2,6-di-tert-butylphenol, and 2,6-di-tert- 4-n-butylphenol. The antioxidants may also be used in combination of two or more depending on characteristics of the antioxidants used.

Content of the antioxidant in the polyolefin resin composition is preferably 10–1000 ppm, more preferably 20–500 ppm by weight of the resin composition. When content of the antioxidant is less than 5 ppm or more than 1000 ppm, die lip stain readily occurs and especially, when it is more than 1000 ppm, adhesion between the substrate and the resin layer tends to be inferior.

Incorporation of the antioxidant into the resin composition can be carried out by using so-called compound which comprises a polyolefin resin in which the antioxidant is previously contained, by using a suitable amount of a resin in which the antioxidant is contained at a relatively high concentration, or by adding the antioxidant at the time of preparation of the resin composition by a kneader. The above methods can be suitably combined depending on kind and content of the antioxidant used.

As the thermoplastic resins used in the present invention, there may be used any of those which can be coated to form a resin film on a substrate paper and examples thereof are homopolymers such as polyolefins, polystyrenes, polyvinyl chloride, polyacrylic esters, linear polyesters (e.g., polyethylene terephthalate), polyamides (e.g., nylon), cellulose esters, and polyacrylonitriles; copolymers such as ethylene-vinyl acetate copolymers; and mixtures thereof. Preferred are thermoplastic resins such as polyolefins, polystyrenes, polyethylene terephthalate, and polyvinyl chloride. Especially preferred are polyolefin resins from the points of cost and their superior extrusion coatability and adhesion to a substrate paper.

The polyolefin resins used in the present invention include, for example, homopolymers such as polyethylene, polypropylene, polybutene, and polypentene; copolymers comprising two or more of α-olefins such as ethylene-propylene copolymer and ethylenebutylene copolymer; and mixtures thereof. Among them, polyethylene resins are especially preferred from the point of melt coatability and from economical view point. The polyethylene resins include, for example, low-density polyethylenes, medium-density polyethylenes, high-density polyethylenes, straight-chain low-density polyethylenes, copolymers of ethylene and α-olefins such as propylene and butylene, carboxy-modified polyethylenes and mixtures thereof. These may have various densities, melt flow rates (hereinafter referred to as "MFR"), molecular weights, and molecular weight distributions. Normally, those which have a density of 0.90–0.97 $g/cm^3$, an MFR of 1–30 g/10 min, preferably 3–15 g/10 min and a molecular weight of 20,000–250,000 may be used singly or in admixture of two or more. When the resin layer comprises multi-layer, resins of different properties and construction can be used for respective layers, namely, a resin having an MFR of, for example, 5–20 g/10 min can be used as the uppermost layer and a resin having an MFR of, for example, 2–10 g/10 min can be used as a lower layer.

In order to contain the titanium dioxide pigment in the resin layer of the resin-coated paper type photographic support, there may be usually employed a method of using a so-called masterbatch, which is a resin composition prepared previously by mixing the titanium dioxide pigment with a diluent polyolefin resin to a desired concentration, or using a so-called compound, in which the titanium dioxide pigment is thoroughly mixed with a polyolefin resin at a desired concentration from the start. These masterbatch and compound are usually prepared by a Banbury mixer, a kneader, an extruder for kneading, a twin-roll mill, a three-roll mill, and the like. Of these, the Banbury mixer and the extruder for kneading are advantageously used. These kneading machines may be used in combination of two or more.

In order to improve releasing characteristics of the polyolefin resin layer from cooling roll in production of the resin-coated paper type photographic support, it is preferred to contain a metal salt of a fatty acid in the resin layer of the photographic resin-coated paper by adding the metal salt of fatty acid to a mixture of the polyolefin resin and the titanium dioxide pigment when they are processed into the masterbatch or compound of the titanium dioxide pigment. As the metal salt of fatty acid, there may be mentioned, for example, zinc stearate, calcium stearate, aluminum stearate, magnesium stearate, zirconium octylate, sodium palmitate, calcium palmitate, and sodium laurate. Addition amount of the salt is preferably 0.1–50% by weight based on the titanium dioxide pigment and 0.01–5% by weight based on the resin layer containing the titanium dioxide pigment.

When content of the titanium dioxide pigment in the resin layer of the resin-coated paper type photographic support in the present invention is less than 7% by weight based on the resin, sharpness of the printed image formed on the photographic support is insufficient. When it exceeds 35% by weight, the resin composition becomes less flowable so that it cannot be extruded properly, or it brings about increased die lip stain. Especially preferable content is 9–30% by weight.

It is preferred to contain a fluorescent agent in the resin layer of the resin-coated paper type photographic support in order to reduce yellowness caused by the titanium dioxide pigment, especially when the titanium dioxide pigment is contained at a high concentration in the resin layer for obtaining especially high sharpness. As the fluorescent agents, there may be used various ones such as naphthalene type, stilbene type, thiophene type and coumarin type, but bis(benzoxazolyl)naphthalene type and/or bis(benzoxazolyl)stilbene type fluorescent agents having a substituting group are preferred from the points of improvement of whiteness, dispersibility in the polyolefin resin, heat resistance, bleed-out resistance, weathering resistance and stability in photographic processing solution of the fluorescent agent. Examples of these preferable naphthalene type fluorescent agents and stilbene type fluorescent agents are those which are represented by the following formulas. For naphthalene type fluorescent agents, preferred are those which have a substituting group having 6 or more carbon atoms considering the bleed-out resistance.

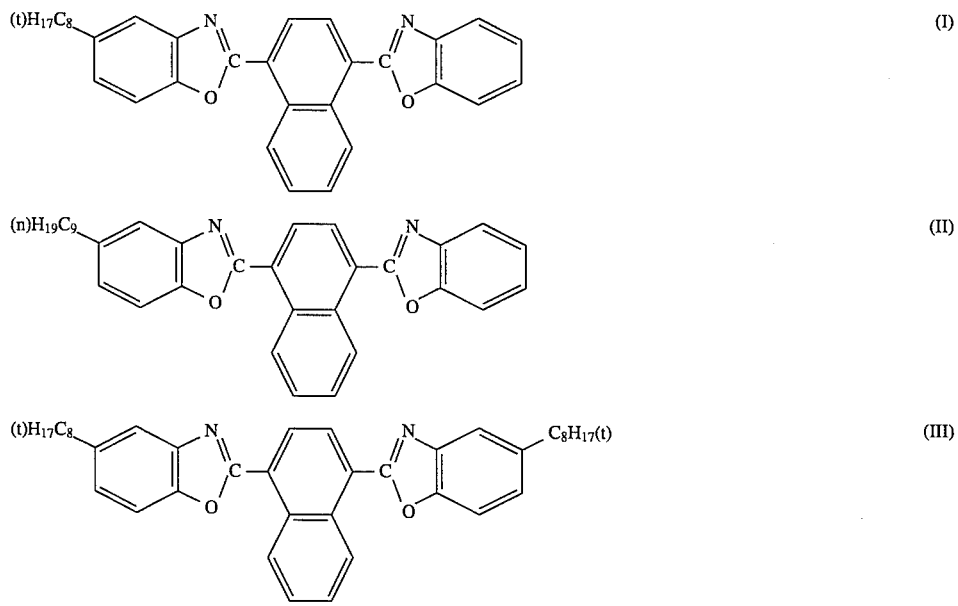

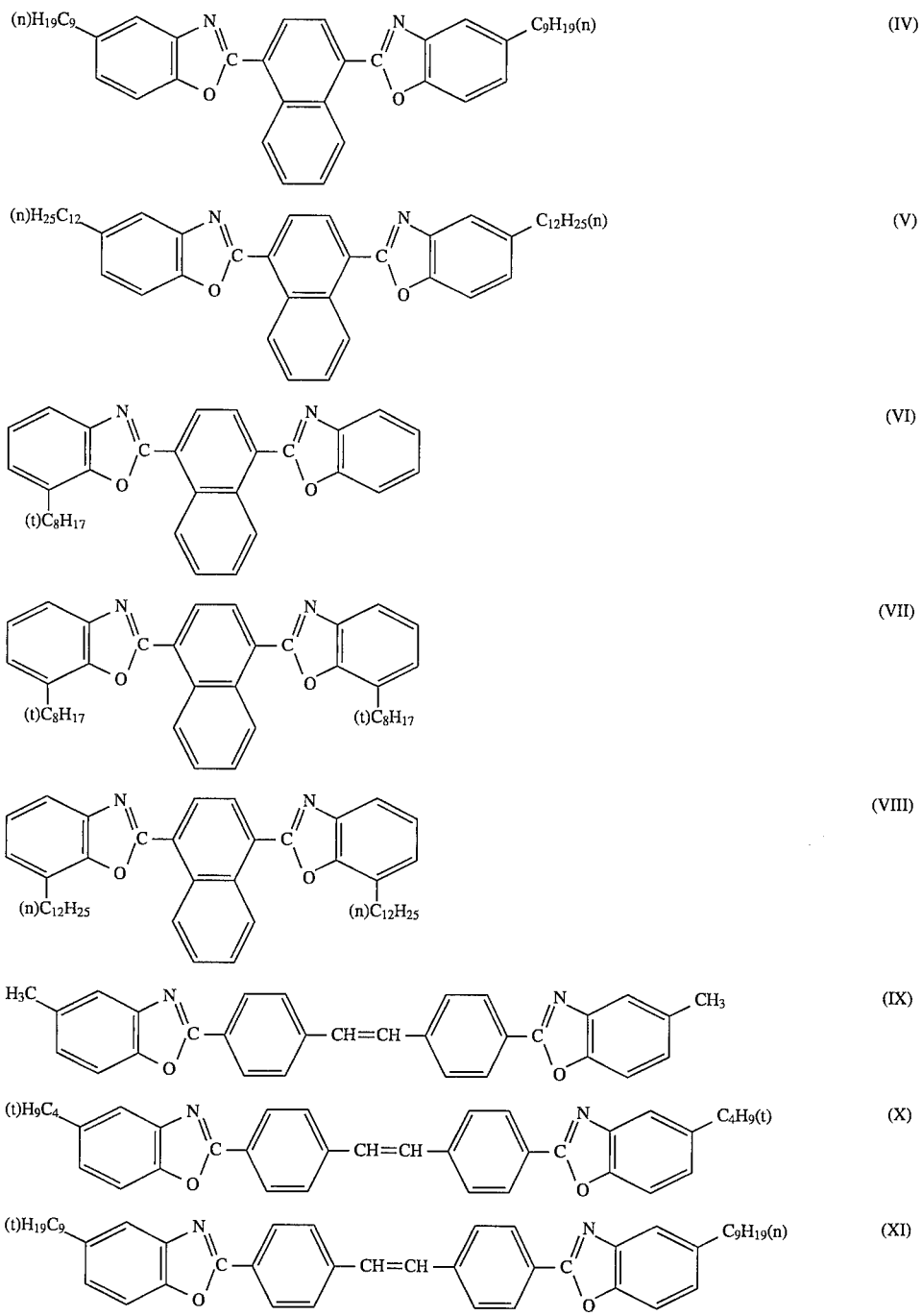

The fluorescent agent can be contained in the polyolefin resin composition by adding it during a step of preparing masterbatch or compound of the titanium dioxide pigment to make a masterbatch or a compound which comprises the titanium dioxide pigment, the fluorescent agent, the polyolefin resin, and the dispersing agent such as a metal salt of fatty acid.

The fluorescent agent can also be contained in the resin composition in the following manner. That is, the fluorescent agent is preliminarily mixed with a low molecular weight polyolefin which is solid at room temperature and is lower than the main polyolefin resin in softening point and/or a dispersing agent such as a metal salt of fatty acid, and the resulting mixture is dispersed in the main polyolefin resin to make a fluorescent agent masterbatch, thereby to contain the fluorescent agent in the resin composition. Content of the fluorescent agent in the resin layer of the photographic support is preferably 0.3–30 mg/m$^2$, more preferably 0.5–10 mg/m$^2$, from overall view points of whiteness, processability of the resin, bleed-out resistance and the like.

It is preferred to contain inorganic or organic, blue pigments or blue dyes in the resin layer of the resin-coated paper type photographic support of the present invention, thereby to further enhance the apparent whiteness of the support. Examples of these pigments and dyes include cobalt blue, Prussian blue, and ultramarine as inorganic compounds ad cerulean blue, phthalocyanine blue, Chromophthal Blue A3R as organic compounds. Addition amount of the pigments or dyes is 0.025–0.5% by weight, preferably 0.05–0.2% by weight of the resin layer for inorganic blue pigments, and 0.001–0.1% by weight, preferably 0.0025–0.05% by weight of the resin layer for organic blue compounds. When the amount is too small, coloration cannot be attained and when it is too large, not only lightness reduces, but also die lip stain occurs much.

Furthermore, it is advantageous to contain, if necessary, inorganic or organic magenta pigments or magenta dyes in the resin layer of the resin-coated paper type photographic support. Examples thereof are cobalt violet, fast violet, manganese violet, reddish ultramarine and quinacridone red. Addition amount thereof is 0.025–1.0% by weight, preferably 0.1–0.4% by weight of the resin layer for inorganic magenta pigments, and 0.001–0.3% by weight, preferably 0.002–0.015% by weight of the resin layer for organic magenta compounds.

The resin-coated paper type photographic support of the present invention has a resin layer which contains the titanium dioxide pigment and antioxidant and, more preferably, the above-mentioned metal salt of fatty acid, fluorescent agent, and inorganic or organic coloring pigment or coloring dye. When the resin layer comprises multi-layer, the above-mentioned titanium dioxide pigment, antioxidant, metal salt of fatty acid, fluorescent agent, and coloring pigment or dye may also be contained in the additional resin layer in addition to the resin layer of the present invention. Moreover, the resin layer on the image-forming side of the photographic support and the resin layer on the opposite side of the support may preferably contain, in addition to the above titanium dioxide pigment, antioxidant, metal salt of fatty acid, fluorescent agent, and coloring pigment or dye, various additives, e.g., white pigments such as titanium dioxide other than that of the present invention, zinc oxide, talc, and calcium carbonate; fatty acid amides such as stearic acid amide and arachidic acid amide; organosilicone compounds such as polyorganosiloxane; and ultraviolet absorbers such as Tinuvin 320, Tinuvin 326 and Tinuvin 328 (trade name of Ciba-Geigy Co., Ltd.) in optional combination.

The photographic support prepared in this invention is produced by a so-called extrusion coating method, in which the molten thermoplastic resin, preferably the polyolefin resin is casted on the running sheet to coat usually both sides of the substrate such as paper, synthetic paper or a film with the resin. In order to form a resin layer having a multilayer structure, preferably used is a so-called tandem extrusion system, in which the inner resin layer and the outermost resin layer on the front side of the photographic support are successively, preferably continuously, formed by extrusion coating or a so-called coextrusion coating system, in which the outermost resin layer and the inner resin layer are simultaneously formed by extrusion coating. Before the substrate is coated with the resin, the substrate is preferably subjected to an activating treatment such as a corona discharge treatment, a flame treatment or the like. The emulsion-layer side of the photographic support has a glossy surface, a finely toughened or matte surface to such an extent that it does not affect the gloss of the surface of the photographic paper obtained therefrom disclosed in Japanese Patent Application Kokai No. 55- 26507, a silky surface or the like. Usually, the back side of the photographic support has a dull surface. The front side or, if necessary, both sides of the photographic support may be subjected to an activating treatment such as a corona discharge treatment, a flame treatment or the like. The photographic support may be further subjected to an subbing treatment as disclosed in Japanese Patent Application Kokai No. 61-84634 after the activating treatment. The thickness of the resin layer on the front or back side is not critical; however, in general, it is preferably 10–50 μm.

The substrate used in this invention includes a natural pulp paper mainly composed of natural pulp; a synthetic fiber-containing paper composed of natural pulp and a synthetic fiber; a synthetic fiber paper mainly composed of a synthetic fiber; a so-called synthetic paper produced by making a film composed of a synthetic resin such as polystyrene, polypropylene or the like into a paper form; and a film composed of cellulose acetate, poly(ethylene terephthalate), polycarbonate or the like. As the substrate for a polyolefin resin-coated paper, the natural pulp paper (hereinafter referred to as "base paper") is advantageously used in view of the objects of this invention of providing economically a photographic support which attains a print excellent in image sharpness, in which substantially no microgrits or streaks due to the die lip stain appear, and which therefore has excellent surface property.

As a pulp composing the base paper used in this invention, advantageously used is a natural pulp appropriately selected as disclosed in Japanese Patent Application Kokai Nos. 58-37642, 60-67940, 60-69649, 61- 35442 and the like. However, if necessary, synthetic pulp or synthetic fiber may be used along with the natural pulp. As the natural pulp, preferably used is a wood pulp such as softwood pulp, hardwood pulp or a mixture thereof, which has been subjected to usual bleaching with chlorine, hypochlorite, chlorine dioxide or the like; alkali extraction or alkali treatment; oxidation bleaching with hydrogen peroxide, oxygen or the like; or a combination of these treatments. Moreover, various pulps may be used such as kraft pulp, sulfite pulp, soda pulp and the like.

Into the base paper used in this invention may be incorporated various sizing agents or polymer in the preparation of a slurry of the paper stock.

Sizing agents for the base paper preferably used in this invention include metal salts of fatty acids, fatty acids, alkylketene dimers, alkenyl- or alkyl-succinic anhydrides, epoxized amides of higher fatty acids as disclosed in Japanese Patent Application Kokai No. 54-147211 and organic fluoro compounds as disclosed in Japanese Patent Application Kokai No. 56- 109343.

The sizing agent suitable for the base paper used in this invention includes metal salts of fatty acids and fatty acids in such a form that they can be fixed to pulp using a water-soluble aluminum salt such as aluminum chloride, sulfite alumina, poly(aluminium chloride) or the like; alkylketene dimers in such a form that they can be fixed with or without the water-soluble aluminium salt and a combination of the alkylketene dimer and an epoxized amide of a higher fatty acid. The metal salts of higher fatty acids and the fatty acids are preferably those having 12–22 carbon atoms and they are preferably added in an amount of 0.5–4.0% by weight based on the bone-dry weight of the pulp. The proportion of the solid weight of the water-soluble aluminium salt optionally added to the weight of the sizing agent is preferably 1/20–4/1, more preferably 1/10–1/1. The alkyl group of the alkylketene dimers has preferably 8–30 carbon atoms, more preferably 12–18 carbon atoms. Usually, alkylketene dimers are available on the market in the form of an emulsion, a specific example of which is Aquapel 360XC (a trade name of Dic Hercules Chemicals. Inc.). They are added preferably in an amount of 0.2–4.0% by weight based on the bone-dry weight of the pulp.

The high molecular weight compound advantageously added to the base paper used in this invention in the stock preparation includes a cationic wet-strength-reinforcing agent or a cationic, anionic or amphoteric strength-reinforcing agent. The cationic wet-strength-reinforcing agent is preferably polyamine-polyamide-epichlorohydrin resin and it is added in an amount of preferably 0.05–4.0% by weight, more preferably 0.15–1.5% by weight, based on the dry weight of the pulp. Specific examples of the cationic wet-strength-reinforcing agent are Kymene 557H, kymene S-25, Epinox P-130 (these are trade names of Dic Hercules Chemicals. Inc.) and the like.

The cationic, anionic and amphoteric strength-reinforcing agents include cationized starch as disclosed in Japanese Patent Application Kokoku 60-17103; cationic poly(vinyl alcohol) as disclosed in Japanese Patent Application Kokai No. 63-214748; cationic polyacrylamide as disclosed in Japanese Patent Application Kokai Nos. 57-185432 and 57-197539; anionic polyacrylamide as disclosed in Japanese Patent Application Kokoku Nos. 62-23119 and 62-31118; amphoteric polyacrylamide as disclosed in Japanese Patent Application Kokoku No. 61-37613 and Japanese Patent Application Kokai No. 59-31949; vegetable galactomannan as disclosed in Japanese Patent Application Kokai No. 59-125731; and the like. They are added in an amount of preferably 0.05–8% by weight, more preferably 0.15–4% by weight, based on the dry weight of the pulp.

To the base paper used in this invention may be added various additives in the preparation of the paper slurry. There may be added, in proper combination, a filler such as clay, kaolin, potassium carbonate, barium sulfate, magnesium silicate, titanium dioxide or the like; a pH modifier such as sodium hydroxide, sodium carbonate or the like; a coloring pigment, a coloring dye or a fluorescent whitening agent as disclosed in Japanese Patent Application Kokai No. 54-147033 and Japanese Patent Application Kokai Nos. 63-204251 and 1-266537.

To the base paper used in this invention may be added various water-soluble polymers, antistatic agents, latices, emulsions, pigments, pH modifiers and the like by spraying or tab size pressing. The water-soluble polymer includes starchy polymers as disclosed in Japanese Patent Application Kokai No. 1-266537, poly(vinyl alcohol)-type polymers, gelatinic polymers, polyacrylamide-type polymers, cellulosic polymers and the like. The antistatic agent includes alkali metal salts such as sodium chloride, potassium chloride and the like as disclosed in Japanese Patent Application Kokai No. 1- 266537; alkaline earth metal salts such as calcium chloride, barium chloride and the like; colloidal metal oxides such as colloidal silica and the like; organic antistatic agents as disclosed in Japanese Patent Application Kokai No. 58-82242; and the like. The latices and emulsions include petroleum resin emulsion and latices of styrene/acrylic acid/acrylic acid ester terpolymer, styrene/acrylic acid/butadiene terpolymer, ethylene/vinyl acetate copolymer, styrene/maleic acid/acrylic acid ester terpolymer and the like. The pigment includes clay, kaolin, talc, barium sulfate, titanium dioxide and the like. The pH modifier includes hydrochloric acid, phosphoric acid, citric acid, sodium hydroxide, sodium carbonate and the like. These are advantageously used in appropriate combination with the coloring pigment, coloring dye or fluorescent agent mentioned above.

In order to make the base paper used in this invention, there may be used a conventionally used paper machine such as Fourdrinier machine, a cylinder machine or the like; however, it is advantageous to adopt an appropriate method for making paper as disclosed in Japanese Patent Application Kokai Nos. 58-37642, 61- 260240 and 61-284762. Though the thickness of the base paper is not critical, the base paper is preferably treated by a calender after the base paper is made as shown in Japanese Patent Application Kokai Nos. 58-37642 and 60-126397. The basis weight of the base paper is preferably 40–250 g/m$^2$.

For the purpose of the prevention of static electrification, curling or the like, various backcoats layers may additionally be applied to the photographic support of this invention. The backcoat layers may contain in appropriate combination an inorganic antistatic agent, an organic antistatic agent, a hydrophilic binder, a latex, a hardening agent, a pigment, a surfactant and the like as disclosed in Japanese Patent Application Kokoku Nos. 52-18020, 57- 9059, 57-53940, 58-56859; Japanese Patent Application Kokai Nos. 59-214849 and 58-184144; and the like.

The photographic support obtained in this invention is further applied with various photograph-constituting layers and can be applied to a variety of uses such as a color photographic paper, a monochromic photographic paper, a phototype-setting photographic paper, a copy photographic paper, a reversal photographic material, a negative and positive photographic material for silver salt dispersion transfer, a printing material and the like. As example of the photographic layers, there can be mentioned a photographic emulsion layer of silver chloride, silver bromide, silver chlorobromide, silver iodobroide, silver chloroiodobromide or the like. The photographic emulsion layer containing a silver halide may contain color couplers to form a silver halide constituting layer having a multilayer structure. The emulsion layer may contain a physical developing nucleus to form a receiving layer for silver salt dispersion transfer.

As a binder of these photographic layers, there may be used a hydrophilic polymer such as poly(vinyl pyrrolidone), poly(vinyl alcohol), a sulfuric acid ester of a polysaccharide or the like in addition to a conventional gelatin. The photographic layer may contain various additives. For example, there may be contained, in appropriate combination, an optical sensitizing dye such as a cyanine dye, a merocyanine dye or the like; a chemical sensitizer such as a water-soluble gold compound, a sulfur compound or the like; an antifoggant or a stabilizer such as a hydroxytriazolopyrimidine compound, a mercaptoheterocyclic compound or the like; a hardening agent such as formaldehyde, a vinylsulfone compound, an aziridine compound or the like; an auxiliary agent for coating such as a salt of benzensulfonic acid, a salt of sulfosuccinic acid or the like; an anti-contaminant such as a dialkylhydroquinone compound or the like; other components such as a fluorescent whitening agent, a dye for improving the sharpness, an antistatic agent, a pH modifier, a fogging agent, or a water-soluble iridium or rhodium compound in the production or dispersion of a silver halide.

The photographic material containing a silver halide obtained from the photographic support produced in this invention is subjected to treatments such as exposure, development, termination, fixing, bleach, stabilization and the like as shown in "Photosensitive Materials for Photography and Handling Thereof" by Goro Miyamoto, published by Kyoritsu Shuppan Co., Ltd., Photographic Techniques Course Vol. 2, depending upon the photographic material thereof.

Especially, the multi-layered silver halides color photographic material can be processed in a color development bath containing any kind of a developing agent such as CD-III, CD-IV (these two compounds are products of Kodak Co., Ltd.), Droxychrom (a trade name of May & Bayker Co., Ltd.) or the like, and further processed in a single bleaching-fixing bath. The developing solution in the bath contains the developing agent and may also contain a development accelerator such as benzyl alcohol, a thallium salt, phenidone or the like, or the solution may be of a type containing substantially no benzyl alcohol. A useful single bath bleaching-fixing liquid is a solution of a metal salt of aminopolycarboxylic acid (e.g. a complex ferric salt of ethylenediaminetetraacetic acid, propylenediaminetetraacetic acid, etc.), and a useful fixing agent contained therewith is e.g. sodium thiosulfate, ammonium thiosulfate or the like; the solution may further contain a variety of additives, for example, a desilver accelerator (e.g. mercaptocarboxylic acid as disclosed in U.S. Pat. No. 3,512,979, a mercaptoheterocyclic compound as disclosed in Belgian Patent No. 682,426, etc.), an anticontaminant, a pH modifier, a pH buffering agent, a hardening agent (e.g. magnesium sulfate, aluminium sulfate, potassium alum, etc.), a surfactant and the like. While pH of such single bleaching-fixing bath liquid may vary, a useful pH range is 6.0–8.0.

The following Examples further illustrate the invention.

EXAMPLE 1

Titanium dioxide was subjected to hydrolysis and washing in the production process for rutile type titanium dioxide pigment according to sulfuric acid method mentioned in this specification and then was concentrated by a filter. The thus concentrated titanium dioxide was put in a kneader and a predetermined amount of magnesium sulfate was added thereto, followed by well stirring. Then, the mixture was subjected to calcination under predetermined conditions so that diameter of titanium dioxide particle was as shown in Table 1. The resulting rutile type titanium dioxide clinker was subjected to grinding and dressing of grains and besides to wet grinding and classification to obtain titanium dioxide slurry substantially free from coarse particles.

Amount of magnesium compound on the surface of titanium dioxide particles in mentioned this specification is one obtained analytically by the following method.

1.0000 g of titanium dioxide clinker sample is accurately weighed and put in a crucible. Thereto is added 10 ml of a special grade 36 wt % hydrochloric acid solution. The crucible is closed and the content is heated at 360° C.±20° C. for 15 minutes on a sand bath and cooled and then is filtrated (if the filtration is incomplete, centrifugal separation is employed in combination) and then, is washed with 10 ml of a dilute hydrochloric acid obtained by diluting 10 ml of special grade 36 wt % hydrochloric acid solution with 490 ml of distilled water. To the resulting filtrate is added 3 ml of 3% by weight solution of special grade $SrCl_2.6H_2O$ in distilled water and total amount is adjusted to 100 ml with distilled water. This is used as a test solution. This test solution is subjected to atomic-absorption spectroscopy and concentration of magnesium in the test solution is calculated by previously obtained calibration curve. Thus, amount of magnesium compound present on the surface of titanium dioxide particles is determined.

The above slurry was introduced into an acid washing tank and then, dilute sulfuric acid was added thereto to adjust to pH 1.0 and to carry out acid-washing. A sample prepared without addition of dilute sulfuric acid was employed as a control sample. The acid-washing was carried out by the stored water method. The slurry temperature at acid-washing was kept at 45° C. and acid-washing with stored water for 30 minutes was repeated three times.

Thereafter, pH of the slurry was raised to about 9.2 with sodium hydroxide and temperature of the slurry was adjusted to about 70° C. and then, to the slurry was added an aqueous sodium aluminate solution in an amount of 0.5% by weight in terms of $Al_2O_3$ based on the dry titanium dioxide and this was left to stand for 30 minutes.

Then, pH of the slurry was lowered to 7.0 with addition of 20% sulfuric acid and the slurry was aged for 2 hours. Thereafter, the original mother liquor of the titanium dioxide slurry surface-treated with sodium aluminate was filtered by a filter press and subsequently, the titanium dioxide cake in the filter press was washed with flowing water under the predetermined water washing conditions until the suspension electric conductivity of the titanium dioxide pigment defined above reached 50 µv/cm.

The titanium dioxide cake was dried and impact ground by a hammer mill with a quantitative feeder and furthermore was subjected to the finishing grinding in a steam mill to produce the titanium dioxide pigments mentioned in Table 1.

50 parts by weight of each of the resulting titanium dioxide pigment, 50 parts by weight of low-density polyethylene (MFR=7, density 0.923 g/cm$^3$), and 2.5 parts by weight of zinc stearate were well kneaded at 150° C. by a Banbury mixer to obtain a masterbatch of the above titanium dioxide pigment.

A mixture of 50 parts by weight of bleached hardwood kraft pulp and 50 parts by weight of bleached softwood sulfite pulp was beaten to a Canadian standard freeness of 310 ml and thereto were added, based on 100 parts by weight of the pulp, 3 parts by weight of cationized starch, 0.2 part by weight of anionized polyacrylamide, 0.4 part by weight (as ketene dimer content) of an alkylketene dimer emulsion, 0.4 part of a polyamino-polyamide-epichlorohydrin resin. From the resulting paper stock, a paper of 160 g/m$^2$ in basis weight was made and this wet paper was dried at 110° C. Then, successively the paper was impregnated in a proportion of 25 g/m$^2$ with an impregnating solution comprising 3 parts by weight of carboxy-modified polyvinyl alcohol, 0.05 part by weight of a fluorescent brightener, 0.002 part by weight of a blue dye, 0.2 part by weight of citric acid, and 97 parts by weight of water, dried with a hot air of 110° C., and was further subjected to supercalendering under a linear pressure of 90 kg/cm. Thereafter, both sides thereof were subjected to corona discharge treatment to make a base paper ready for being coated with resin to make a photographic support.

Next, the back side of the base paper was coated with a 1:1 mixture of a high-density polyethylene (density 0.960 g/cm$^3$, MFR=5) and a low-density polyethylene (density 0.923 g/cm$^3$, MFR=5) at a thickness of 30µ at a resin temperature of 330° C. by a melt extrusion coater. Then, the front side of the base paper was coated with a resin composition comprising 30 parts by weight of the above masterbatch of titanium dioxide pigment, 20 parts by weight of a high-density polyethylene (density 0.960 g/cm$^3$, MFR=5), and 50 parts by weight of a low-density polyethylene (density 0.923 g/cm$^3$, MFR=5) at a thickness of 30µ at a resin temperature of 330° C. to make a polyethylene resin-coated paper containing the titanium dioxide pigment. In this case, the surface of the polyethylene containing the titanium dioxide pigment was processed to a glossy surface and the surface of the polyethylene on the back side was processed to a matte surface like paper.

The number of microgrit formed on the surface of the polyethylene resin containing the titanium dioxide pigment of the thus obtained polyethylene resin-coated paper was visually counted.

Die lip stain was evaluated in the following manner.

The polyethylene resin composition containing the titanium dioxide pigment was melt extruded using a screw type extrusion machine having an extrusion bore of 65 mm and a T-die of 750 mm width at a resin temperature of 320° C.

and at a screw revolution speed of 100 rpm for 2 hours. Then, the number of stain generated at die lip was counted.

Next, in order to make comparison on sharpness of a printed image, a color photographic paper having the above obtained photographic support was made. First, the back side of the photographic support was subjected to corona discharge treatment and then was coated with 0.4 g/m² of a backcoat layer comprising colloidal silica and styrene/acrylic latex at a dry weight ratio of 1:1. Then, the resin layer containing the titanium dioxide pigment on the front side of the photographic support was subjected to corona discharge treatment and then coated with a blue-sensitive emulsion layer containing yellow-coloring coupler, an intermediate layer containing an anti-color mixing agent, a green-sensitive emulsion layer containing a magenta-coloring coupler, an ultraviolet absorbing layer containing an ultraviolet absorber, a red-sensitive emulsion layer containing a cyan-coloring coupler, and a protective layer to make a color photographic paper. Each color-sensitive emulsion layer contained 0.6 g/m² of silver chlorobromide in terms of silver nitrate and further contained gelatin necessary for preparation, dispersion and film-formation of silver halide and besides, an antifoggant, a sensitizing dye, a coating aid, a hardener, a thickner and a filter dye in a proper amount.

A resolving power chart was brought into close contact with the photographic paper obtained above. This assembly was exposed to green light and the exposed photographic paper was subjected to color developement to obtain a test sheet. Sharpness of the image formed on the test sheet was visually evaluated. Criteria for the evaluation are as follows:

⊚: Very good

○: Good

◉: Fairly good

Δ: Fairly bad occurred a little and besides, sharpness of a printed image formed was good. However, even if the titanium dioxide pigment was prepared through the acid-washing step, when analytical value of the clinker was 2.48% by weight in terms of magnesium oxide and particle diameter of the titanium dioxide pigment was 0.102 μm, both the die lip stain and the microgrit occurred somewhat much. Similarly, when amount of magnesium oxide was 0.0058% by weight and particle diameter of the titanium dioxide pigment was 0.162 μm, both the die lip stain and the microgrit occurred a little, but sharpness of a printed image was somewhat inferior.

On the other hand, even if amount of magnesium oxide based on the titanium dioxide and particle diameter of the titanium dioxide pigment are both within the scope of the present invention, when the titanium dioxide pigment was prepared without the acid-washing step, both the die lip stain and the microgrit occurred much and there is practical problem.

EXAMPLE 2

The same procedure as in Example 1 was repeated, except that the following composition was used as the resin composition containing the titanium dioxide pigment on the front side of the photographic resin-coated paper.

First, 50 parts by weight of a low-density polyethylene (density 0.918 g/cm³, MFR=7) to which tetrakis[methylene(3,5-di-tert-butyl-4-hydroxy-hydrocinnamate)]methane as an antioxidant was previously added so that it was contained in such an amount as shown in Table 2, 50 parts by weight of a rutile type titanium dioxide pigment which was the same as of Sample No. 3 or No. 13 mentioned in Table 1, and 2.5 parts by weight of zinc stearate were well kneaded by a Banbury mixer at 150° C. to prepare a masterbatch of the titanium dioxide pigment containing the antioxidant.

TABLE 1

| | Sample No. | Amount of magnesium oxide in clinker (note 1) | Acid-washing step | Particle diameter of titanium dioxide pigment (μm) (note 2) | The number of microgrit (/m²) | Total number of die lip stain (Note 3) | Sharpness |
|---|---|---|---|---|---|---|---|
| The present invention | 2 | 2.01 % by weight | Carried out | 0.110 | 3.6 | 5 | ○ |
| | 3 | 1.04 | " | 0.115 | 1.4 | 5 | ⊚ |
| | 4 | 0.55 | " | 0.120 | 0.9 | 3 | ⊚ |
| | 5 | 0.10 | " | 0.127 | 0.5 | 1 | ⊚ |
| | 6 | 0.021 | " | 0.134 | 0.6 | 1 | ⊚ |
| | 7 | 0.012 | " | 0.149 | 0.6 | 2 | ○ |
| Outside the present invention | 8 | 0.0058 | " | 0.162 | 0.7 | 2 | Δ |
| | 1 | 2.48 | " | 0.102 | 7.1 | 12 | ◉ |
| Outside the present invention | 11 | 2.48 | Not carried out | 0.102 | 30 | 28 | ◉ |
| | 12 | 2.01 | " | 0.110 | 24 | 20 | ○ |
| | 13 | 1.04 | " | 0.115 | 20 | 18 | ⊚ |
| | 14 | 0.55 | " | 0.120 | 16 | 14 | ⊚ |
| | 15 | 0.10 | " | 0.127 | 14 | 12 | ⊚ |
| | 16 | 0.021 | " | 0.134 | 12 | 11 | ⊚ |
| | 17 | 0.012 | " | 0.149 | 13 | 10 | ○ |
| | 18 | 0.0058 | " | 0.162 | 13 | 11 | Δ |

(Note 1): Percent by weight in terms of MgO based on the dry titanium dioxide.
(Note 2): The number-average diameter defined in this specification.
(Note 3): Total number of die li stain which occurred on the front side and the rear side of the die.

As is clear from Table 1, when the titanium dioxide pigment contained in the resin layer on the image forming side of the resin-coated paper type photographic support had an analytical value of magnesium of titanium dioxide clinker corresponding to the titanium dioxide pigment of 2.01–0.012% by weight in terms of magnesium oxide based on the titanium dioxide and was prepared through the acid-washing step and had a particle diameter of 0.110–0.149 μm, both the die lip stain and the microgrit Separately, 0.28 part by weight of fluorescent agent [IX] mentioned hereabove and 0.28 part by weight of zinc stearate were previously well mixed. The resulting mixture and 40 parts by weight of the same low-density polyethylene as used for preparation of the above titanium dioxide pigment masterbatch were well kneaded in a Laboplastomill at 135° C. to prepare a fluorescent agent masterbatch.

Except for Sample No. 29 in Table 2, 30 parts by weight of the above titanium dioxide pigment masterbatch, 20 parts by weight of a high-density polyethylene (density 0.960 g/cm³, MFR=5), and 50 parts by weight of a low-density polyethylene (density 0.923 g/cm³, MFR=5) were blended to obtain a resin composition for front side of the photographic support.

For Sample No. 29, 30 parts by weight of the above titanium dioxide pigment masterbatch, 20 parts by weight of a high-density polyethylene (density 0.960 g/cm³, MFR=5), 47 parts by weight of a low-density polyethylene (density 0.923 g/cm³, MFR=5), and 3 parts by weight of the above masterbatch containing the fluorescent agent were blended and the blend was used as a resin composition for front side of the photographic support.

The results obtained are shown in Table 2.

The samples shown in Table 2 were all superior in sharpness of a printed image, but Sample No. 29, which corresponds to Sample No. 24 in which a specific fluorescent agent was additionally contained, was further improved in visual whiteness and had very good quality as a photographic support.

In contrast with the above, it can be seen that generation of die lip stain was not inhibited so much even when a proper amount of the antioxidant was added to the resin composition containing the titanium dioxide pigment used in Sample No. 13 of Table 2 (amount of magnesium oxide in clinker: 1.04% by weight of the titanium dioxide; particle diameter of the titanium dioxide pigment: 0.115 μm; without acid-washing). See Sample No. 30 and Sample No. 31.

TABLE 2

|  | Sample No. | Kind of titanium dioxide pigment in resin layer (Note 4) | Acid-washing step | Amount of antioxidant (ppm) (Note 5) | Presence of fluorescent agent | The number of microgrit (/m²) | Total number of die lip stain | Sharpness | Apparent whiteness |
| --- | --- | --- | --- | --- | --- | --- | --- | --- | --- |
| The present invention | 21 | No. 3 | Carried out | 0 | No | 1.4 | 5 | ⊙ | ○ |
|  | 22 | " | " | 10 | " | 1.2 | 2 | ⊙ | ○ |
|  | 23 | " | " | 20 | " | 1.0 | 0 | ⊙ | ○ |
|  | 24 | " | " | 150 | " | 0.8 | 0 | ⊙ | ○ |
|  | 25 | " | " | 300 | " | 0.9 | 0 | ⊙ | ○ |
|  | 26 | " | " | 500 | " | 0.9 | 2 | ⊙ | ○ |
|  | 27 | " | " | 1000 | " | 0.8 | 5 | ⊙ | ○ |
|  | 28 | " | " | 2000 | " | 0.9 | 9 | ⊙ | ○ |
|  | 29 | " | " | 150 | Yes | 0.8 | 0 | ⊙ | ⊙ |
| Outside the present invention | 30 | No. 13 | Not carried out | 0 | No | 20 | 18 | ⊙ | ○ |
|  | 31 | " | " | 150 | No | 17 | 15 | ⊙ | ○ |

(Note 4): The same titanium dioxide pigment as used in Sample No. 3 or No. 13 shown in Table 1 of Example 1.
(Note 5): Addition amount of antioxidant in the resin composition on the front side (image-forming side) of the support.

It can be seen from Table 2 that generation of die lip stain was highly inhibited by adding a proper amount of the antioxidant to the resin composition containing the titanium dioxide pigment used in Sample No. 3 (amount of magnesium oxide in the clinker: 1.04% by weight of titanium dioxide; particle diameter of the titanium dioxide pigment: 0.115 μm; with acid-washing).

Addition amount of the antioxidant is preferably 10–500 ppm, more preferably 20–300 ppm based on the resin composition. When it is more than 1000 ppm, die lip stain tends to increase and besides, adhesion between the base paper and the resin layer deteriorates.

EXAMPLE 3

A titanium dioxide pigment was prepared in the same manner as in Example 1, except that barium chloride was used in place of magnesium sulfate in a predetermined amount. Photographic supports were made using the titanium dioxide in the same manner as in Example 1.

The results obtained are shown in Table 3.

TABLE 3

|  | Sample No. | Amount of barium chloride in clinker (% by weight) (Note 6) | Particle diameter of titanium dioxide pigment (μm) | Acid-washing step | The number of microgrit (/m²) | Total number of die lip stain | Sharpness |
| --- | --- | --- | --- | --- | --- | --- | --- |
| The present invention | 42 | 1.78 | 0.114 | Carried out | 1.6 | 4 | ⊙ |
|  | 43 | 0.51 | 0.125 | " | 0.6 | 1 | ⊙ |
|  | 44 | 0.025 | 0.138 | " | 0.7 | 1 | ⊙ |
| Outside the present invention | 45 | 0.0044 | 0.167 | " | 0.7 | 2 | △ |
|  | 41 | 2.91 | 0.101 | " | 8.8 | 15 | ⊚ |
| Outside the present invention | 51 | 2.91 | 0.101 | Not carried out | 35 | 31 | ⊚ |
|  | 52 | 1.78 | 0.114 | " | 22 | 20 | ⊙ |
|  | 53 | 0.51 | 0.125 | " | 18 | 16 | ⊙ |
|  | 54 | 0.025 | 0.138 | " | 15 | 14 | ⊙ |
|  | 55 | 0.0044 | 0.167 | " | 17 | 15 | △ |

(Note 6): Percent by weight in terms of BaO based on titanium dioxide on the dry basis.

As can be seen from Table 3, occurrence of die lip stain and microgrit as well are restrained and sharpness of a printed image was satisfactory when the barium analytical value of titanium dioxide clinker corresponding to the titanium dioxide pigment contained in the resin layer on the image-forming side of the resin-coated paper type photographic support was 1.78–0.025% by weight in terms of barium oxide based on the titanium dioxide, the titanium dioxide pigment was prepared through an acid washing step and particle diameter of the titanium dioxide pigment was 0.114–0.138 μm. On the other hand, even if the titanium dioxide pigment was prepared through the acid-washing step, die lip stain and microgit both occurred much if analytical value of the clinker was 2.91% by weight in terms of barium oxide and particle diameter-of the titanium dioxide pigment was 0.101 μm. Similarly, when the amount of barium oxide was 0.0044% by weight and particle diameter of the titanium dioxide pigment was 0.167 μm, die lip stain and microgrit were both less, but sharpness of a printed image was somewhat inferior.

On the other hand, even if amount of barium oxide based on the titanium dioxide and particle diameter of the titanium dioxide pigment were both within the ranges of the present invention, die lip stain and microgrit both occurred much to cause practical problem in use, when the titanium dioxide pigment was prepared without the acid-washing step.

EXAMPLE 4

A titanium dioxide pigment was prepared in the same manner as in Example 1, except that magnesium chloride was used in place of the predetermined amount of magnesium sulfate and a photographic support was made in the same manner as in Example 1. Subsequently, die lip stain and microgrit were examined to obtain the similar results to those in Example 1.

As explained in detail hereabove, the titanium dioxide pigment of the present invention is suitable for use in a resin layer of a resin-coated paper type photographic support and has the merit that die lip stain and microgrit occur quite little even when content of the titanium dioxide pigment is increased in order to enhance sharpness of a printed image.

What is claimed is:

1. A process for producing a photographic support comprising a substrate, at least one side of which is coated with a thermoplastic resin composition, wherein the process comprises the following steps:
    (a) adding at least one alkaline earth metal compound to titanium dioxide in an amount of 0.01–2.0% by weight in terms of a metal oxide based on the titanium dioxide before calcination, and subjecting the titanium dioxide and alkaline earth metal compound to calcination,
    (b) acid-washing the titanium dioxide at acidic state after the calcination and before a step of surface treatment with a hydrated metal oxide,
    (c) drying the titanium dioxide,
    (d) grinding the titanium dioxide, whereby a particle size of the titanium dioxide is 0.110–0.150 μm shown by number-average diameter obtained by measuring the diameter in a certain direction using an electron microscope,
    (e) kneading the resulting titanium dioxide pigment with a thermoplastic resin to obtain a resin composition, and
    (f) melt-extrusion coating the substrate with the thermoplastic resin composition.

2. A process according to claim 1, wherein the thermoplastic resin is a polyolefin resin.

3. A process according to claim 1, wherein the thermoplastic resin composition contains an antioxidant.

4. A process according to claim 3, wherein the antioxidant is a hindered phenol type antioxidant.

5. A process for producing a photographic support comprising a substrate, at least one side of which is coated with a thermoplastic resin composition, wherein the process comprises the following steps:
    (a) adding at least one alkaline earth metal compound to titanium dioxide in an amount of 0.01–2.0% by weight in terms of a metal oxide based on the titanium dioxide before calcination, subjecting the titanium dioxide and alkaline earth metal compound to calcination,
    (b) acid-washing the titanium dioxide at acidic state after the calcination and before a step of surface treatment with a hydrated metal oxide,
    (c) drying the titanium dioxide,
    (d) grinding the titanium dioxide using a fluid energy mill, whereby a particle size of the titanium dioxide is 0.110–0.150 μm shown by number-average diameter obtained by measuring the diameter in a certain direction using an electron microscope,
    (e) kneading the resulting titanium dioxide pigment with a thermoplastic resin to obtain a resin composition, and
    (f) melt-extrusion coating the substrate with the thermoplastic resin composition.

6. A process according to claim 5, wherein the polyolefin resin in a polyethylene resin.

* * * * *